J. O. BROWN.
Guard-Finger.

No. 215,789.  Patented May 27, 1879.

WITNESSES:
Chas. N. Kimball.
Chas. S. Mooney.

INVENTOR:
James O. Brown
By Dwyfoutains
his atty

UNITED STATES PATENT OFFICE.

JAMES O. BROWN, OF BENTON, ASSIGNOR OF ONE-HALF HIS RIGHT TO HENRY W. SPRATT, OF ORRINGTON, MAINE.

IMPROVEMENT IN GUARD-FINGERS.

Specification forming part of Letters Patent No. 215,789, dated May 27, 1879; application filed November 16, 1878.

*To all whom it may concern:*

Be it known that I, JAMES O. BROWN, of Benton, in the county of Kennebec and State of Maine, have invented certain new and useful Improvements in Mowers and Reapers; and I do hereby declare that the following is a full, clear, and exact description of the invention, that will enable others skilled in the art to which it appertains to make and use the same, reference being had to the accompanying drawings, forming a part of this specification, in which—

Figure 1:
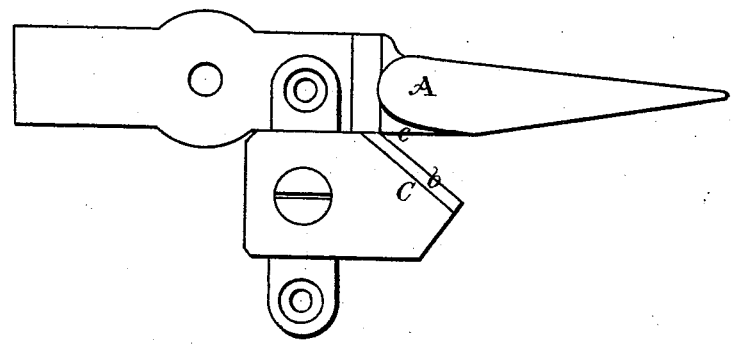
Figure 2:
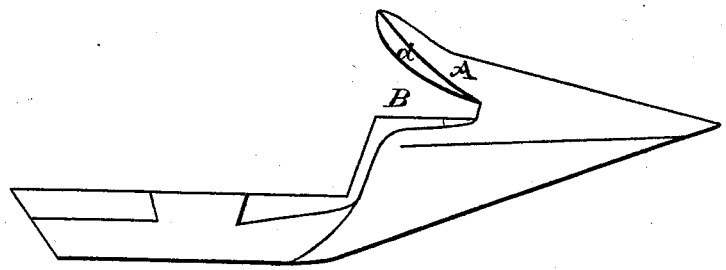

Figure 1 is a top-plan view of my improved open finger, having the sectional spiral flange A and the cutter C. Fig. 2 is a right-hand side view of the same.

Same letters show like parts in both figures.

My invention consists of an improved guard-finger for the cutter-bar of mowing and reaping machines, and is designed to prevent clogging, and to cause the regular and even distribution of the grass or grain. It is particularly adapted to machines having endless-chain cutters; but with slight change may be used to advantage on reciprocating machines.

Referring to the drawings, A shows the guard-finger, slotted at B, through which slot the cutter C passes, severing the grass or grain as it passes over the edge of the slot. This slot is not parallel as to its top and bottom, but the upper portion or extension of the finger A curves upward, as shown, the general form of the opening, as seen from the side, being quasi-triangular, the apex being toward the point of the finger A, and the under side of the upper portion or extension curved upward. This is shown in Fig. 2. This gives a good clearance as the machine moves forward, and prevents clogging. In addition to this, the under surface of the extension at $d$ is chamfered off on the side toward the cutting-edge of the cutters.

The ordinary guard-finger has a slot with parallel, or nearly parallel, top and bottom, between which the cutter passes, cutting the grass or grain between the cutting-edge of the tooth and the lower edge of the slot. The tendency is, of course, to throw the grass or grain across or in the line of the teeth; but the motion of the machine being forward, the tendency of such motion is to lay the grass directly back. The resultant of these two component forces is to leave the grass or grain in a diagonal position across the teeth; but in my finger the under side of the extension $d$, being chamfered, as described, forms an inclined plane, which, as the grass is forced against it, guides it backward, tending, with the forward motion of the machine, to counteract the impulse given by the teeth, and laying the grass directly backward over the cutter-bar, and distributing it smoothly and evenly.

In the reciprocating machine the chamfer $d$ is formed on both sides of the extension of the finger.

What I claim as my invention, and desire to secure by Letters Patent, is—

1. In a mowing or reaping machine, a guard-finger, A, slotted, as shown, said slot consisting of a quasi-triangular opening, its apex being toward the point of the finger, and the under surface of the extension being curved upwardly, substantially as shown in Fig. 2.

2. In combination with the cutting apparatus of a reaping or mowing machine, the slotted guard-fingers, provided with an inclined and chamfered extension projecting above the cutters, and adapted to direct the fall of the grass or grain, as and for the purpose specified.

In testimony that I claim the foregoing I have hereunto set my hand this 2d day of November, 1878.

JAMES O. BROWN.

Witnesses:
 JOHN B. SMITH,
 D. W. SCRIBNER.